United States Patent [11] 3,626,178

[72] Inventor Martin J. Cohen
 W. Palm Beach, Fla.
[21] Appl. No. 13,030
[22] Filed Feb. 20, 1970
[45] Patented Dec. 7, 1971
[73] Assignee Franklin GNO Corporation
 West Palm Beach, Fla.

[54] GAS OR LIQUID CHROMATOGRAPH WITH DETECTOR EMPLOYING ION-MOLECULE REACTIONS AND ION DRIFT
23 Claims, 6 Drawing Figs.

[52] U.S. Cl. .................................................. 250/41.9 TF,
 250/41.9 G, 250/41.9 S
[51] Int. Cl. ........................................................ H01j 39/34,
 B01d 59/44
[50] Field of Search .......................................... 250/41.9 G,
 41.9 TF, 41.9 S

[56] References Cited
UNITED STATES PATENTS
| | | | |
|---|---|---|---|
| 2,810,075 | 10/1957 | Hall .............................. | 250/41.9 TF |
| 3,254,209 | 5/1966 | Fite .............................. | 250/41.9 SB |
| 3,471,692 | 10/1969 | Llewellyn ..................... | 250/41.9 G |

Primary Examiner—Archie R. Borchelt
Assistant Examiner—C. E. Church
Attorney—Raphael Semmes

ABSTRACT: Components of the effluent of a gas or liquid chromatograph are detected by reacting molecules of the components with primary ions to produce secondary ions which may be segregated in accordance with their drift velocity in a drift field. In certain embodiments, the ions are analyzed in a mass spectrometer, which may include an electron multiplier coupled to a signal averaging computer. Molecular and/or ionic concentrators may be employed to increase the concentration of the sample, and liquid samples may be analyzed after preliminary vaporization. Ion formation and drift take place under atmospheric or higher pressure conditions, while mass analysis is performed under high-vacuum conditions.

INVENTOR
MARTIN J. COHEN

BY *Raphael Semmes*

ATTORNEY

PATENTED DEC 7 1971
3,626,178
SHEET 2 OF 2
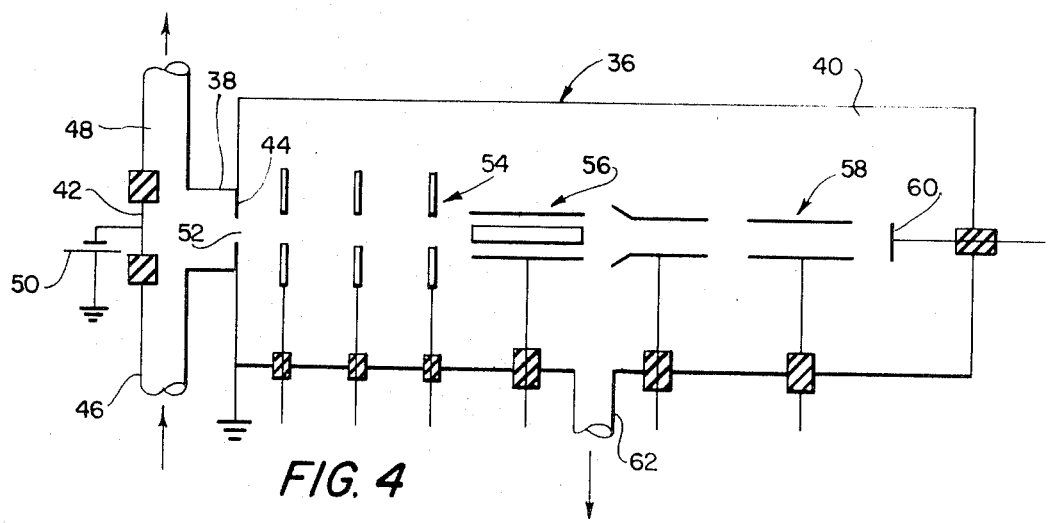
FIG. 4
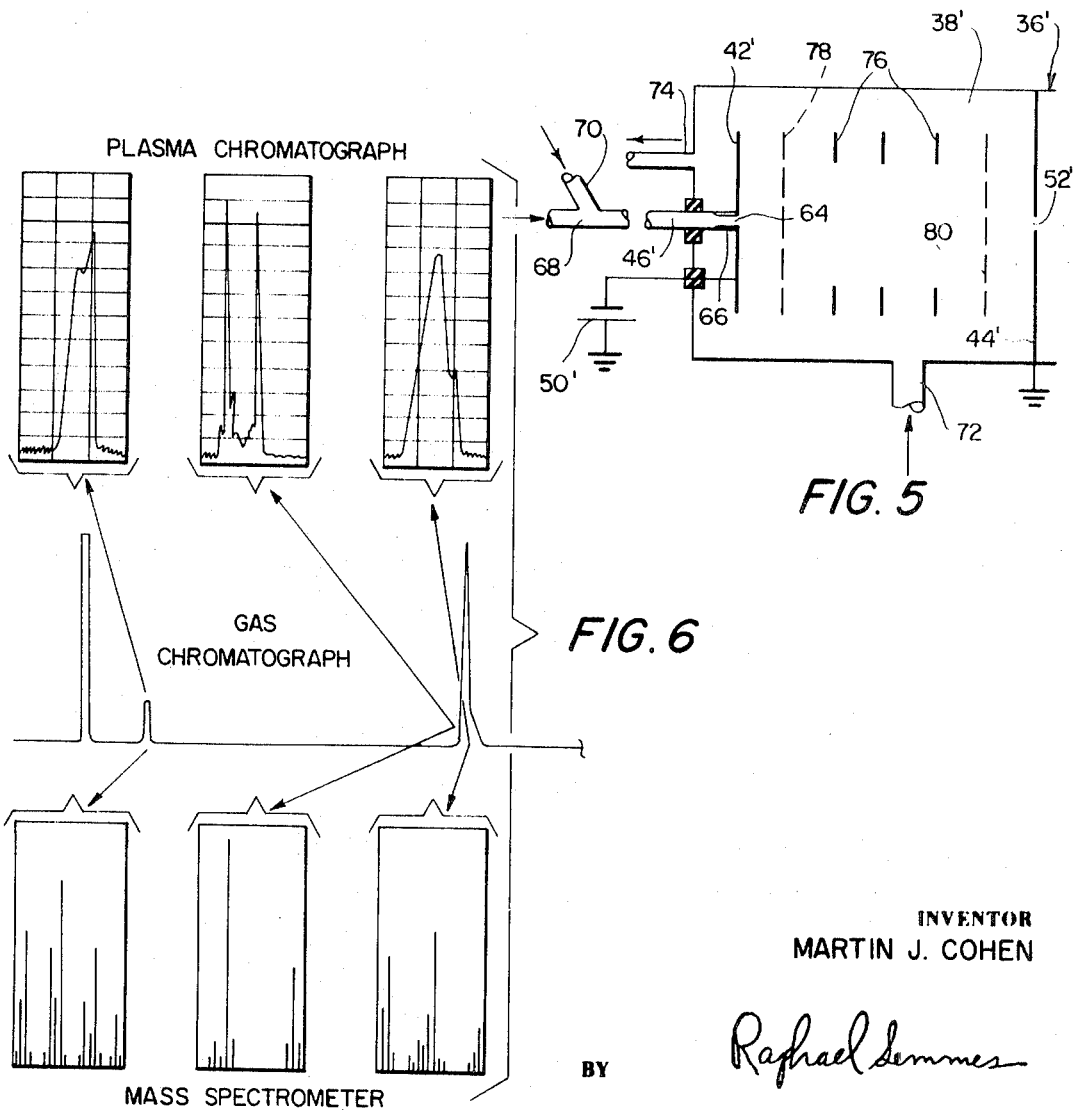
FIG. 5
FIG. 6
INVENTOR
MARTIN J. COHEN
BY Raphael Semmes
ATTORNEY 3,626,178

GAS OR LIQUID CHROMATOGRAPH WITH DETECTOR EMPLOYING ION-MOLECULE REACTIONS AND ION DRIFT

BACKGROUND OF THE INVENTION

This invention relates to apparatus and methods for detecting and measuring trace components of the effluent of a gas or liquid chromatograph and is particularly concerned with producing measurements of high-sensitivity and resolution.

It has heretofore been proposed to employ a mass spectrometer as the detector of a gas chromatograph in order to obtain better resolution of the gas chromatograph peaks. It is customary in operating the gas chromatograph-mass spectrometer combination to try to concentrate the trace material with respect to the carrier gas before the sample is applied to the mass spectrometer. In general, this is necessary because the gas chromatograph has too much total effluent for the pumping capacity of an economical mass spectrometer. Several types of separators or concentrators have been employed to enrich the trace gas in the helium or hydrogen carrier gas fed to the mass spectrometer. Commonly, such separators utilize the relative ease with which the lighter carrier gas will diffuse away from the heavier traces gases under the proper conditions, as in a porous plug or a jet. Such molecular filters are employed as an interface between the gas chromatograph and the mass spectrometer.

The copending application of Martin J. Cohen, David I. Carroll, Roger F. Wernlund, and Wallace D. Kilpatrick, Serial No. 828,402, filed May 27, 1969, for "Apparatus and Methods for Detecting and Identifying Trace Gases," and the copending application of David I. Carroll, Roger F. Wernlund and Martin J. Cohen, Ser. No. 847,115, filed Aug. 4, 1969, for "Apparatus and Methods Employing Ion-Molecule Reactions in Batch Analysis of Volatile Materials," disclose the combination of a "Plasma Chromatograph" and a mass analyzer or mass spectrometer for producing high-sensitivity, high-resolution trace gas measurements. "Plasma Chromatography" is a technique described more fully in an earlier copending application of Martin J. Cohen, David I. Carroll, Roger F. Wernlund, and Wallace D. Kilpatrick Serial No. 777,964, filed Oct. 23, 1968, for "Apparatus and Methods for Separating, Concentrating, Detecting, and Measuring Trace Gases," by which measurements upon trace gases can be preformed at atmospheric pressure without modification of the parent materials. Moreover, the measurements can be performed very rapidly (in seconds) and at high-sensitivity (of the order of one part in $10^{12}$, for example). Succinctly stated, the system of that earlier copending application involves the formation of primary or reactant ions from a reactant gas and the reaction of the primary ions with molecules of trace substances to form secondary or product ions, which may be concentrated, separated, detected, and measured by virtue of the velocity or mobility of the ions in an electric field. A significant advantage of the system is that measurements are preferably performed at or about atmospheric pressure, where the ions reach substantially constant mass-dependent statistical terminal velocity in the drift field.

BRIEF DESCRIPTION OF THE INVENTION

The present invention is concerned with the utilization of a Plasma Chromatograph as an ionic interface between a gas (or liquid) chromatograph and a mass spectrometer, the Plasma Chromatograph serving as the ion source for the mass spectrometer (which lacks the usual ionizing electron beam). The sample input to the mass spectrometer is enriched by focusing the ions and allowing the neutral molecules to be pumped away. Moreover, by employing a Plasma Chromatograph which incorporates ion gating, it is possible to obtain ion sorting for improved signal-to-noise ratio. Molecular and/or ionic filters or concentrators may also be employed in conjunction with the invention, and, if desired, an output may be taken directly from the Plasma Chromatograph without additional mass analysis. It is accordingly a principal object of the invention to provide such apparatus and methods.

Briefly stated, in accordance with the present invention, an output fraction of the effluent of a gas or liquid chromatograph is applied to a Plasma Chromatograph, wherein primary ions are reacted with the molecules of components of the sample to produce product ions which are detected. The ions may be segregated in accordance with their velocity in a drift field, focused, subjected to mass analysis in a mass spectrometer, and measured by the utilization of an electron multiplier and a signal averaging computer. Prior to application to the Plasma Chromatograph, the sample may be concentrated by molecular filters or ionic concentrators. Liquid samples may be volatilized as a preliminary step.

BRIEF DESCRIPTION OF THE DRAWINGS

The invention will be further described in conjunction with the accompanying drawings, which illustrate preferred and exemplary embodiments, and wherein:

FIG. 4 is a diagrammatic longitudinal sectional view of a Plasma Chromatograph-mass spectrometer which may be employed in the invention;

FIG. 5 is a diagrammatic longitudinal sectional view of a modified form of Plasma Chromatograph which may be employed in the invention; and FIG. 6 is a graphical diagram illustrating comparative output curves for the gas chromatograph, Plasma Chromatograph, and mass spectrometer.

DETAILED DESCRIPTION OF THE INVENTION

Figure 1:
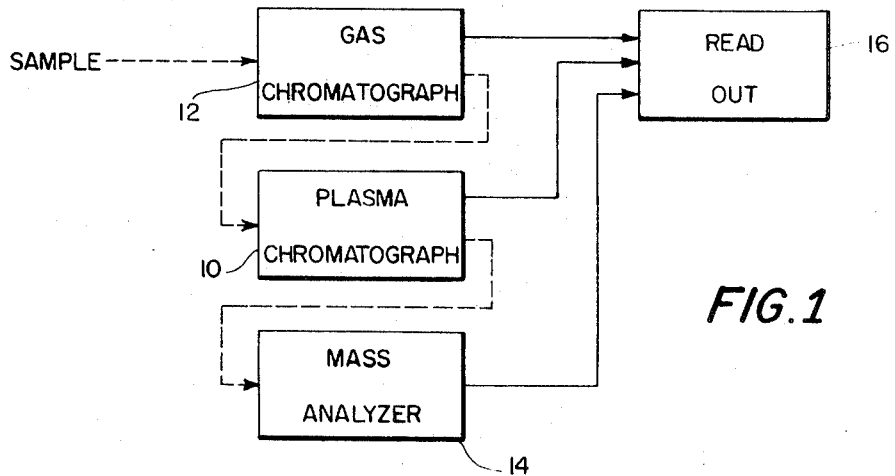
FIG. 1 is a block diagram of a system in accordance with the invention.

Referring to FIG. 1, wherein the dash lines represent gas and/or ion flow paths and the solid line connections represent electrical wiring, a broad principle of the invention is illustrated in the utilization of a Plasma Chromatograph 10 as an interface between a gas chromatograph 12 and a mass analyzer or mass spectrometer 14. As shown, a sample to be analyzed is fed to the gas chromatograph, such as a Perkin-Elmer Model 900, and an output fraction of the effluent is supplied to the Plasma Chromatograph. An ionically concentrated sample from the Plasma Chromatograph is supplied to the mass analyzer 14. The gas chromatograph may have its usual detector, such as a flame ionization detector, and individual outputs from the gas chromatograph, Plasma Chromatograph, and mass analyzer may be obtained from the readout 16. The mass analyzer may be any conventional type, such as a quadrupole mass spectrometer with an electron multiplier type ion detector, such as a Bendix Channeltron, and the Plasma Chromatograph serves as its ion source. The readout is preferably a signal averaging computer or multichannel analyzer, such as the Fabri-Tek Series 1070 manufactured by Fabri-Tek Instruments, Inc. of Madison, Wisconsin.

Figure 2:
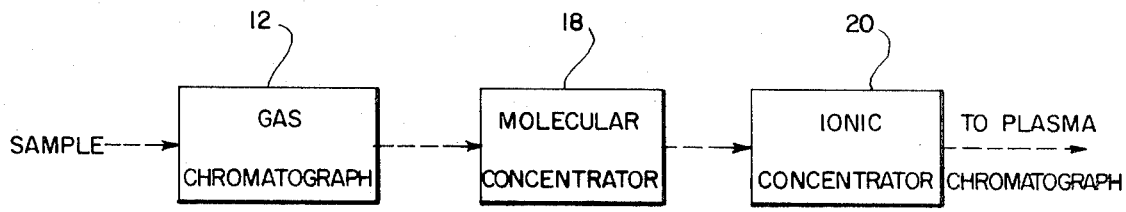
FIG. 2 is a block diagram of a portion of a system of the invention employing preliminary concentrators.

As shown in FIG. 2, prior to application to the Plasma Chromatograph, the output fraction from the gas chromatograph 12 may be concentrated, as by the use of a molecular concentrator 18 and/or an ionic concentrator 20. Any conventional molecular concentrator, such as a porous plug or a jet, may be employed to increase the concentration of the heavier trace gas components in the lighter carrier gas from the gas chromatograph. The ionic concentrator may be of the type shown and described in the said copending application Ser. No. 777,964, wherein trace gas molecules in a stream of gas passing through a duct are ionized by means of a radioactive source on the wall of the duct, are moved transversely of the duct by an electric field, neutralized at an electrode, and drawn off in a concentrated stream divergent from the main duct stream.

Figure 3:
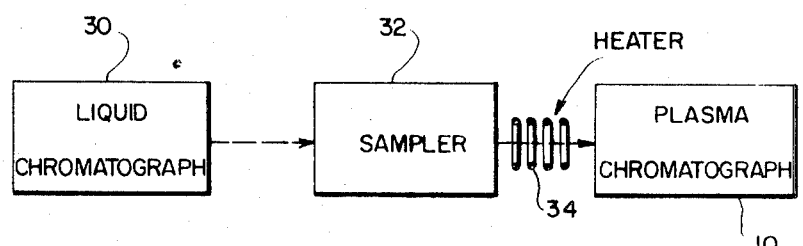
FIG. 3 is a block diagram of a system of the invention specifically for use with a liquid chromatograph.

FIG. 3 illustrates the application of the invention to a liquid chromatograph 30, such as a Waters Associates ALC-100, a liquid fraction being obtained by the sampler 32 and volatilized by a heater before application to the Plasma Chromatograph 10, which should be operated at a temperature high enough to prevent condensation of the sample, and, if desired, to volatilize the sample initially. Such sampling and "hot operation" of the Plasma Chromatograph are described in the aforesaid application Ser. No. 847,115.

The basic requirement for a gas chromatography detector, aside from adequate sensitivity, is small active volume. It is essential that the detection volume be small in order to permit the detector to follow the signal change produced as each separated chemical peak exits from the gas chromatography column. Adequate sensitivity and small active volume are readily attained in the Plasma Chromatography cell.

In the gas chromatography (or liquid chromatography) detector apparatus illustrated in FIG. 4, an envelope 36 is provided with two chambers 38 and 40. The plasma Chromatograph comprises the chamber 38 and a pair of spaced principal electrodes 42 and 44 constituting a simple diode-type Plasma Chromatograph. Electrode 42, which may be insulated from the remaining metal wall structure of chamber 38, is provided with an ionizer, such as a layer of tritium, nickel 63, or other conventional radio-active material. The fractional sample from the gas or liquid chromatograph enters the chamber 38 by inlet 46, passes electrode 42 in a parallel stream, and exits from chamber 38 by means of outlet 48 (any suitable means, such as a small gas pump, being employed to produce the sample flow). If desired, streamlined flow techniques may be employed, as disclosed in the copending application of Martin J. Cohen, Serial No. 865,738, filed Oct. 13, 1969, for "Apparatus and Methods for Improving Measurements Performed Upon Gaseous Samples."

The sample applied to inlet 46 may contain a separate reactant gas, which may be added to the effluent from the gas or liquid chromatograph, as will be later described in connection with FIG. 5, for the formation of primary ions. For example, the reactant gas may comprise oxygen or nitrogen, the molecules of which are readily and preferentially ionized by the ionizer associated with electrode 42. The primary ions are formed closely adjacent to electrode 42. These ions react with the trace molecules in the sample closely adjacent to the electrode 42 and produce secondary ions. By employing a small radioactive source and by adjusting the flow rate of the sample through the chamber 38 to sweep the sample quickly out of the reaction space, the effective reaction volume can be made quite small.

A drift field is applied between electrodes 42 and 44 by means of a high voltage DC source 50, shown diagrammatically as a battery connected between the electrodes. If negative ions are to be detected, the negative terminal of the battery will be connected to electrode 42, as shown, while if positive ions are to be detected, the polarity of the battery will be reversed.

Ions comprising secondary or product ions of the trace substances to be detected and unreacted primary ions drift across the space between electrodes 42 and 44, and some of the ions pass through a small aperture 52 in electrode 44 and enter chamber 40, as described, for example, in the said copending application Serial No. 847,115. Contained within chamber 40 are an ion lens 54 (shown diagrammatically as a series of apertured discs), a mass analyzer (shown diagrammatically as a quadrupole structure 56), and an ion detector 58, which may comprise a Bendix Channeltron electron multiplier type detector having an output electrode 60, all as set forth in copending application Ser. No 847,115. As disclosed in that application, and in the said copending application Serial No. 828,402, the ions entering chamber 40 are focused into a beam and injected into the quadrupole structure. The potential of the quadrupole structure is adjusted so that ions of predetermined mass are accelerated and selectively applied to the electron multiplier structure 58, to produce electrons which are multiplied and which then impinge upon the output electrode 60.

In accordance with the invention, the pressure in chamber 38 is maintained at a level sufficient to ensure that the mean free path of ions in the chamber 38 is very much less than the dimensions of the chamber. In the highly preferred form of the invention, the pressure within chamber 38 is substantially atmospheric, although the pressure within a Plasma Chromatograph chamber can, when appropriate, be increased up to 10 or even a 100 atmospheres by suitable chamber construction and pressurization. The pressure in chamber 40, on the other hand, is very much less than atmospheric, so that the mean free path of ions in chamber 40 is substantially greater than that in chamber 38 and preferably substantially greater than the dimensions of chamber 40. For this purpose, outlet 62 is connected to an appropriate vacuum pump, which may maintain the pressure in chamber 40 at a level of the order of $10^{-4}$ Torr, or less.

FIG. 5 illustrates a modified structure of the invention (primed numerals designating parts corresponding to those of FIG. 4), in which the envelope 36' contains a modified Plasma Chromatograph drift cell chamber 38' (the mass spectrometer and electron multiplier portions of the instrument of FIG. 4 being assumed to exist to the right of electrode 44' but being omitted from the illustration). In this embodiment, the sample enters chamber 38' by means of inlet 46' connected to a central aperture 64 in electrode 42'. Adjacent to aperture 64, the inlet tube is provided internally with an ionizer 66, such as a tritium foil sleeve on the inner wall of the tube, for example, and the primary ion formation and ion-molecule reactions take place in or adjacent to the relatively small volume defined by the ionizer. The gaseous sample from the gas or liquid chromatograph enters the inlet pipe 46' through tube 68, into which a separate reactant gas is introduced by means of a side branch 70. A nonreactive buffer gas may be introduced into the chamber 38' through an inlet 72, as set forth in the copending application of David I. Carroll, Martin J. Cohen and Roger F. Wernlund, Serial, No. 780,851, filed Dec. 3, 1968, for "Apparatus and Methods for Separating, Detecting, and Measuring Trace Gases With Enhanced Resolution." A gas exhaust from the chamber 38' is provided by outlet 74. As more fully disclosed in the said application Serial No. 828,402, a series of guard rings 76 may be employed in the space between the principal electrodes 42' and 44' to maintain the uniformity of the electric field between these electrodes, which is provided by means of the DC source 50'. The drift chamber may be provided with one or more spaced ion gates 78 and 80, which may be of the conventional dual grid shutter type described, for example, in copending applications Serial No. 828,402 and Serial No. 847,115. Appropriate grid drive circuits are provided so that the ion gates may be opened successively, the first ion gate being pulsed to pass a mixed ion population comprising various product ion species and unreacted primary ions, and the second grid being pulsed at a later time to pass predetermined ion species segregated in accordance with their drift velocity in the space between the grids. By scanning the time of opening of grid 80 relative to grid 78, a complete ion drift time spectrum may be obtained at electrode 44'. Ion focusing may be provided on the drift cell side of aperture 52' to focus a beam of ions into the mass spectrometer chamber, as described in the said copending application Serial No. 847,115.

The Plasma Chromatograph apparatus employed in the invention may have different degrees of refinement or complexity depending upon the needs of the instrument. For example, by employing a high-flow rate of the sample in FIG. 4, advantage may be taken of the flow Plasma Chromatography concepts disclosed in copending application of Martin J. Cohen, David I. Carroll and Roger F. Wernlund, Ser. No. 779,097, filed Nov. 26, 1968, for "Apparatus and Methods for Separating, Detecting and Measuring Traces Gases," and copending application of Martin J. Cohen, David I. Carroll and Roger F. Wernlund, Serial No. filed Dec. 16, 1969, for "Apparatus and Methods for Separating, Detecting and Measuring Trace Gases." If desired, multiple reaction regions and additional ion gates may be employed as set forth in the copending application of David I. Carroll, Serial No. 790,108, filed Jan. 9, 1969, for "Apparatus and Methods for Separating, Detecting and Measuring Trace Gases." Ion bunching may be utilized as in the copending application of Martin J. Cohen, Serial No. 812,284, filed Apr. 1, 1969, for "Apparatus and Methods for Improving the Sensitivity of Ion Detection and Measurement," or copending application of Martin J. Cohen, Serial No. 812,285, filed Apr. 1, 1969, for "Apparatus and Methods for Ion Detection and Measurement Employing Pulsed Ion Sources." If additional mass analysis is not necessary, electrode 44' in FIG. 5, for example, may be imperforate, and an output may be taken directly from this electrode. As set forth in the aforesaid application Serial No. 847,115, where the mass spectrometer is employed, a signal averaging computer or multichannel analyzer may be utilized to obtain both the usual Plasma Chromatograph drift spectrum output and the mass spectrometer output. In addition, the output from the usual flame ionization detector of the gas chromatograph may be obtained. The apparatus of the invention may be employed to detect all of the peaks of the gas chromatograph, for example, or merely some of them.

FIG. 6 illustrates typical (but arbitrary) output curves obtained by recording the outputs from the gas chromatograph, the Plasma Chromatograph and the mass spectrometer in accordance with the invention. It will be observed that each peak of the gas chromatograph, reacting with a selected reactant ion, such as $O_2^+$, produces a unique ion drift time spectrum in the Plasma Chromatograph and a highly resolved signature in the mass spectrometer, which gives specific and simple identification of the components of the gas chromatograph peaks. The signal averaging computer provides a quantitative assay of the amount of material of each species. If the reactant ions are changed, as by using $CH_4$ as the reactant gas, for example, or by using oxygen ions, the characteristic signature of each peak will change.

While preferred embodiments of the invention have been shown and described, it will be apparent to those skilled in the art that changes can be made in these embodiments without departing from the principles and spirit of the invention, the scope of which is defined in the appended claims. Accordingly, the foregoing embodiments are to be considered illustrative, rather than restrictive of the invention, and those modifications which come within the meaning and range of equivalents of the claim are to be included therein.

The invention claimed is:

1. A method for producing a readout from a gas or liquid chromatograph, which comprises producing reactant ions, reacting said reactant ions with molecules of at least one component of the effluent from said chromatograph to produce secondary ions, subjecting said ions to a drift field, and detecting at least some of said secondary ions, the reacting and subjecting steps being carried out in a chamber, and the pressure in said chamber being maintained at a level sufficient to ensure that the mean free path of ions in said chamber is very small compared to the dimensions of said chamber and that said ions reach substantially constant mass-dependent statistical terminal velocity in said field.

2. A method in accordance with claim 1, further comprising segregating said secondary ions into groups dependent upon their statistical velocity prior to detecting said ions.

3. A method in accordance with claim 1, further comprising producing a concentrated sample containing said component from said effluent prior to reacting said reactant ions with the molecules of said component.

4. A method in accordance with claim 1, wherein the detecting step is carried out in a further chamber, wherein the secondary ions are passed from the first-mentioned chamber to said further chamber, and wherein the pressure in said further chamber is maintained at a level much less than the pressure in the first-mentioned chamber.

5. A method in accordance with claim 4, wherein said ions are subjected to mass analysis in said further chamber prior to detection.

6. A method in accordance with claim 4, wherein the detecting comprises producing electrons from said ions, multiplying said electrons and producing an output from the multiplied electrons.

7. A method in accordance with claim 1, wherein the ions in said chamber are segregated into groups in accordance with their statistical velocity, by ion gating.

8. Apparatus comprising, combination, a gas or liquid chromatograph, and a detector connected to receive a sample of the effluent of said chromatograph, said detector comprising a chamber having a pair of electrodes spaced apart therein, means for establishing a drift field between said electrodes, means for conducting a sample of effluent from said chromatograph into said chamber and sweeping it past one of said electrodes and out of said chamber, means including ionizing means adjacent to said one electrode for producing primary ions at a localized region adjacent to said one electrode and for causing said ions to produce product ions of at least one component of said effluent sample by ion-molecule reactions at a further region between said electrodes, means for maintaining the pressure in said chamber at a level sufficient to ensure that the mean free path of ions in said chamber is much less than the dimensions of said chamber and such that said ions reach substantially constant mass-dependent statistical terminal velocity in said chamber between said electrodes, and means for detecting at least some of said product ions.

9. Apparatus in accordance with claim 8, wherein said means for producing primary ions comprises means for introducing a reactant gas into said chamber in addition to the sample of effluent from said chromatograph.

10. Apparatus in accordance with claim 8, wherein the pressure in said chamber is at least substantially atmospheric.

11. Apparatus in accordance with claim 8, said chamber having means for gating a portion of said product ions to a drift region of said chamber at which the ions separate in accordance with their mobility.

12. Apparatus in accordance with claim 11, said chamber having additional means for gating a portion of the separated ions to a detecting region.

13. Apparatus in accordance with claim 8, said means for conducting said sample comprising means for directing gas through said chamber in a direction transverse to the direction of said drift field.

14. Apparatus in accordance with claim 8, wherein said chamber has an ion-molecule reaction region followed by an ion drift region, and said apparatus comprises means for maintaining the effective reaction region small compared to the size of said drift region.

15. Apparatus in accordance with claim 8, wherein said means for detecting said ions comprises a mass analyzer.

16. Apparatus in accordance with claim 15, wherein said mass analyzer comprises a further chamber coupled to the first-recited chamber by a small aperture, and wherein said further chamber has means for reducing the pressure therein to a level at which the mean free path of ions is much longer than the mean free path in the first-recited chamber.

17. Apparatus in accordance with claim 8, wherein said means for detecting said ions comprises means for producing electrons in response to said ions, means for multiplying said electrons, and means for producing an output in accordance with the multiplied electrons.

18. Apparatus in accordance with claim 17, wherein said output producing means comprises signal averaging means.

19. Apparatus in accordance with claim 8, further comprising means for focusing said ions into a beam.

20. Apparatus in accordance with claim 8, further comprising means for introducing a nonreactive gas into a drift region of said chamber.

21. Apparatus in accordance with claim 8, further comprising means for concentrating the said component before said sample is introduced into said chamber.

22. Apparatus in accordance with claim 8, wherein said effluent is obtained from a liquid chromatograph and said sample is vaporized before it is introduced into said chamber.

23. Apparatus in accordance with claim 8, wherein said ionizing means is a continuous radioactive source and said field is a DC field.

* * * * *